United States Patent [19]

Cope

[11] Patent Number: 4,919,211

[45] Date of Patent: Apr. 24, 1990

[54] CLOD CRUMBLER

[75] Inventor: Richard E. Cope, Bedford, England

[73] Assignee: National Research Development Corporation, London, England

[21] Appl. No.: 225,895

[22] Filed: Jul. 29, 1988

[30] Foreign Application Priority Data

Jul. 30, 1987 [GB] United Kingdom ................ 8718122

[51] Int. Cl.$^5$ ............................................. A01B 29/06
[52] U.S. Cl. .................................... 172/69; 172/552; 172/520
[58] Field of Search ................ 172/520, 105, 106, 69, 172/68, 521, 528, 536, 552, 608, 606, 121, 72, 65, 46, 48

[56] References Cited

U.S. PATENT DOCUMENTS

| | | | |
|---|---|---|---|
| 809,716 | 1/1906 | Miller | 172/69 |
| 1,519,776 | 12/1924 | Fazekas et al. | 172/541 |
| 1,552,362 | 9/1925 | Versteeg | 172/69 |
| 2,163,726 | 6/1939 | Blunt | 172/69 |
| 3,392,791 | 7/1968 | Orthman | 172/520 |
| 3,897,830 | 8/1975 | van der Lely | 172/68 |
| 4,339,004 | 7/1982 | van der Lely | 172/68 |

FOREIGN PATENT DOCUMENTS

| | | | |
|---|---|---|---|
| 0223269 | 5/1987 | European Pat. Off. | |
| 257711 | 3/1988 | European Pat. Off. | 172/68 |
| 940431 | 8/1955 | Fed. Rep. of Germany | |
| 2488768 | 2/1982 | France | |
| 48206 | 6/1982 | U.S.S.R. | 172/547 |

Primary Examiner—Richard J. Johnson
Attorney, Agent, or Firm—Cushman, Darby & Cushman

[57] ABSTRACT

A crumbler roller device 10 comprises two co-axial soil-engaging rotors 12, 13 mounted one within the other and drive means operative to drive the inner rotor 12 at a different rotational speed to the outer rotor 13.

8 Claims, 9 Drawing Sheets

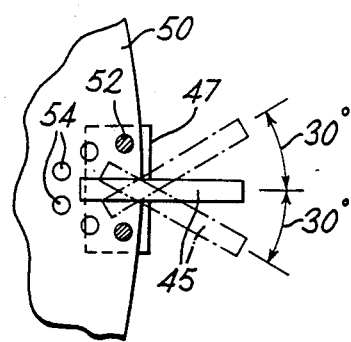
Fig. 6
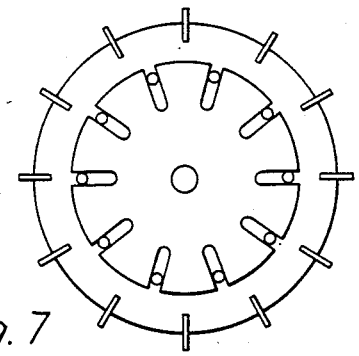
Fig. 7
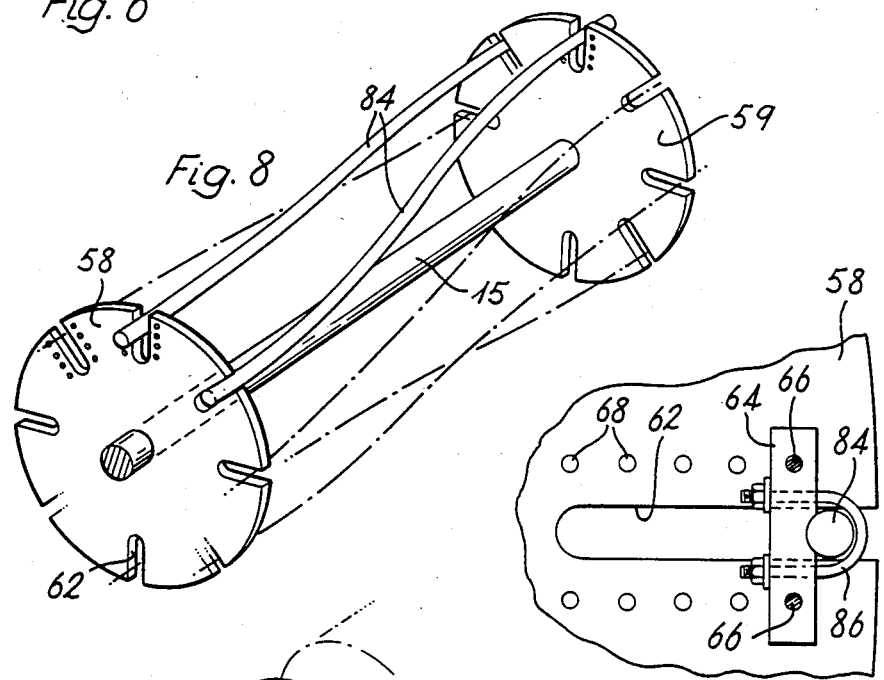
Fig. 8
Fig. 8a
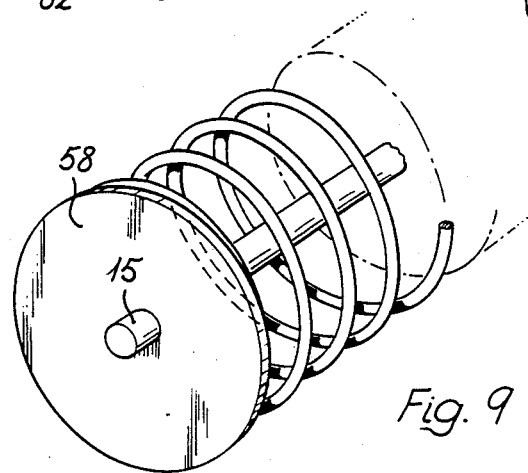
Fig. 9

CLOD CRUMBLER

The present invention relates to a rotary crumbler device for breaking up clods of soil in a field.

It is a disadvantage of previously known rotary crumbler devices that they operate unsatisfactorily when the clods are either too hard or too sticky and one object of the present invention is to provide a rotary crumbler device capable of operating more efficiently in such adverse conditions.

According to the present invention, a rotary crumbler device comprises two soil-engaging rotors mounted one within the other and drive means operative to drive the inner rotor at a different rotational speed to the outer rotor i.e. either in a contrary rotational sense to the outer rotor or at a greater (or lesser) angular velocity in the same rotational sense as the outer rotor.

Conveniently, the two rotors are co-axial.

Normally, the outer rotor will be driven by engagement with the ground and the inner rotor will be driven from the outer rotor, or from a ground wheel, through an appropriate transmission system. Alternatively, one (or both) rotors could be power-driven and in one such system the inner rotor is power-driven and the outer rotor is driven either from the inner rotor or from the ground.

Conveniently, the two rotors are adapted to rotate in the same common rotational sense as would a ground wheel, whereby the treated soil will tend to be thrown out rearwardly of the device. Conveniently, in this case, the inner rotor may be adapted to rotate at up to about ten times (preferably about four times) the angular speed of the outer rotor. Alternatively, the inner rotor may be adapted to rotate in the opposite rotational sense (but at the same rpm, say) as the outer rotor, in which case the treated soil will tend to be thrown out forwardly e.g. against a baffle plate provided for that purpose.

As a further alternative, the inner rotor could be driven in the same rotational sense as would a ground wheel and the outer rotor rotated in the contrary rotational sense to urge the soil into the inner rotor. Once again a baffle plate would be desirable to deflect the treated soil back to earth (and to provide some additional degree of clod breakage).

Conveniently, the overall weight and geometry of the device is such as to immerse the soil-engaging parts of the outer rotor below ground level thereby allowing soil-engaging parts of the inner rotor greater access to the clod-containing top layer of the soil.

The device can be rigidly mounted or it can be sprung.

Conveniently, the soil-engaging parts of the inner and/or outer rotors can take the form of transverse (i.e. axially parallel) or helically disposed elongate elements such as paddles, blades bars, combs e.g. of plane, toothed or serrated form, flails, spikes (pointed or otherwise) and, in the case of the inner rotor only, saw teeth distributed around a central drum.

Where the inner and outer rotors have serrated or toothed soil-engaging parts, then those of the inner rotor may optionally mesh with those of the outer rotor to provide a more agressive soil treatment system.

In all the cases above described, the elements may conveniently be elongate in cross-section and non-radially disposed. The cross-section referred to here is that taken in a plane lying perpendicular to the rotation axis of the relevant rotor. Typically, for example, the elements might be forwardly or rearwardly raked at an angle of up to 60°, say, from their radial positions, values of between 20° and 40° (e.g. 30°) currently being preferred. For the forwardly raked elements, greater penetration is to be expected as they enter the ground in a vertical or more nearly vertical orientation than would be possible with radially disposed elements. For the rearwardly raked elements, any increase in penetration will be due to rotor slippage over the ground.

Conveniently, adjustment means are provided to vary the rake of the soil-engaging parts so as to make it possible to achieve the desired entry angle at one or more different positions of the soil-engaging parts e.g. at positions resulting from a 120° bodily displacement of each soil-engaging part from its highest position, say. This facility might be desirable, for instance, when different penetration conditions exist to those for which the device was previously set.

Where the soil-engaging parts of the inner rotor take the form of transverse or helically-disposed bars, these may be arranged to lie either at a common radius from the rotor axis or at two or more different radii.

In all the above cases, the soil-engaging parts of the inner and/or outer rotors may be joined by one or more plates or blades or like members lying, or each lying, in a respective plane which is perpendicular to the rotation axis of the rotors.

If desired, a third soil-engaging member might be provided within the inner rotor. This could, for example, take the form of a hanging baffle or a central sleeve loosely mounted on an axle member for the rotors. In alternative versions, however, not having this third device, the axle member is omitted to give a more open-centred structure to the device.

The rotary crumbler device of the present invention could either be incorporated as part of a primary cultivation apparatus e.g. to replace the crumbler roll device in existing primary cultivation apparatus or it could be used as, or to form part of, a secondary cultivation apparatus to operate on previously cultivated soil. The invention includes such primary and secondary cultivation apparatus.

The exact operational characteristics of the device will depend on the particular embodiment chosen and also, at least to some degree, on the soil conditions pertaining. Thus whereas in the majority of the embodiments described above, the effect of the outer rotor will be almost exclusively to trap the soil in place while the inner rotor shears any clods present, in at least some of the embodiments outlined above, the outer rotor will itself contribute significantly to the actual breaking up of the clods.

Conveniently, the drive mechanism for the inner rotor could include an overload protection system to protect the machine against damage in the event that a large stone (or other foreign object) is pushed up with the clods. The overload mechanism could, for example, comprise two drive plates located somewhere in the transmission system and joined together by one or more shear bolts. This may not be necessary, however, as the crumbler roller device will normally be used in heavy soils such as clay where large stones will not usually be present.

To achieve a desired 4:1 angular speed ratio between the inner and outer rotors at forward speeds of from 11–16 Km/h, for example (e.g. where the device forms part of a secondary cultivator), an inner rotor speed of between 85 and 480 rpm might be required. This corresponds to a peripheral rotor speed of about 2 to 13 m/second. However, for forward speeds of from 8 to 10 Km/h (draft-towed secondary cultivator) or from 5 to 7 Km/h (primary cultivator) other rotational speeds may be required, e.g. typically, 300 rpm and 200 rpm, respectively, corresponding to peripheral rotor speeds of 8 m/second and 6 m/second respectively. For the upper speed range of 11–16 Km/h, a lower ratio e.g. 2:1, may be preferred.

Conveniently, in all cases, the drive system will include control means for varying the inner rotor speed to suit different soil conditions and/or forward speeds of the device. Typical drive systems include chain and sprocket drives, gear drives, belt drives e.g. using variable pulleys, and contained epicyclic gears.

Clearly the actual amount of soil penetration will vary with ground conditions but, generally speaking, values of around 150 mm penetration will be aimed at for the outer rotor, say, which with a machine of typical dimensions could give a bed depth of around 70 t0 80 mm for the inner rotor to operate on, although in some soil conditions where outer rotor penetration is reduced, this latter value could be as little as 30 mm, say. In many conditions, therefore, the machine will be able to operate as a single pass machine capable of levelling a furrowed field in one pass.

Typical axial dimensions for the rotors might be 3 meters so that these would need to be pivotally mounted so as to be able to swing into a more fore and aft direction of the machine for road transport. As an alternative, the rotor could be axially split up into two or more separate units which could be folded for road transport, each unit being driven from a common central drive during operation in the field. For rollers having a maximum operational axial dimension of 12 meters or so, say, the rotors might typically be divided up into four groups of two units, each 1.5 meters, say, to allow folding for road transport.

Embodiments of the invention will now be described, by way of example only, with reference to the accompanying drawings, some of which are diagrammatic and others of which are at least in part diagrammatic. In the drawings:

FIG. 6 shows part of the outer rotor of the device of FIGS. 1 to 3;

FIGS. 7 and 8 are respectively end and perspective views of alternative designs of inner rotor for the device;

FIG. 8a shows, on a larger scale, a detail of the device of FIG. 8;

FIG. 9 shows a perspective view of part of another alternative design of inner rotor;

Figure 1:
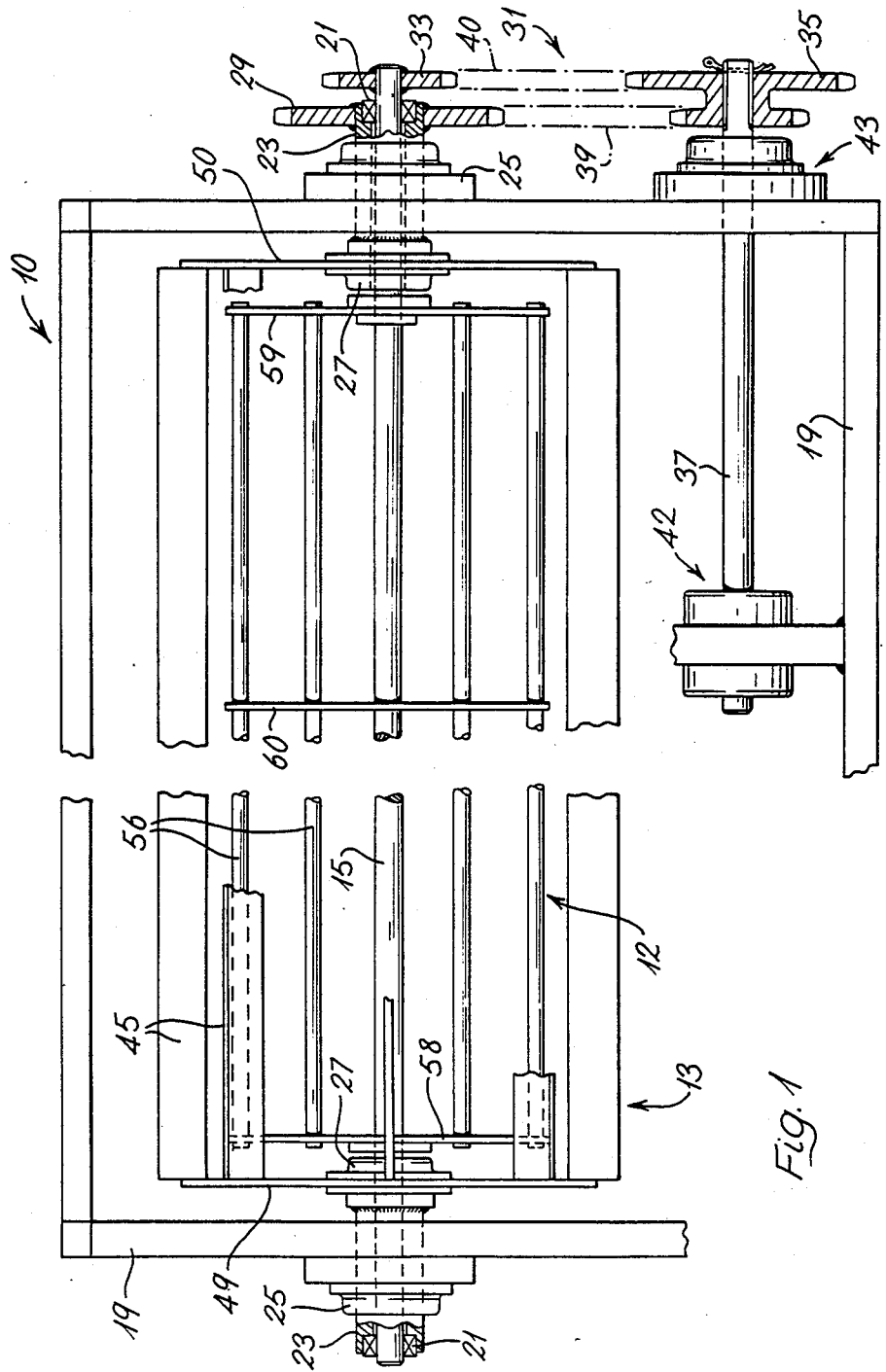
FIG. 1 shows a simplified plan view of a crumbler roller device in accordance with the present invention.

Thus referring first to FIG. 1, a rotary crumbler device 10 designed for forward travel in the range 8–10 Km/h comprises two co-axial soil-engaging rotors 12, 13 mounted one within the other for rotation about a common axis at differing speeds.

The inner rotor 12 is secured to an axle member 15 supported on bearings 21 within hollow stub axles 23 of the outer rotor 13. Stub axles 23 are in turn supported in bearing blocks 25 mounted on the frame 19 and the inner rotor 12 is further supported on the axle member 15 by bearing blocks 27.

Mounted on the outside of stub axle 23 is the first sprocket wheel 29 of a chain and sprocket transmission system 31 by which the inner rotor 12 is driven from the outer rotor 13 in a 4:1 speed ratio. The transmission system is completed by a second sprocket wheel 33 mounted on the projecting end of axle member 15 and by an idling double-sprocket wheel 35 mounted on a lay shaft 37 and linked with wheels 29,33 by sprocket chains 39,40. Reference numerals 42,43 indicate frame-supported bearing blocks for the lay shaft 37.

Figure 2:
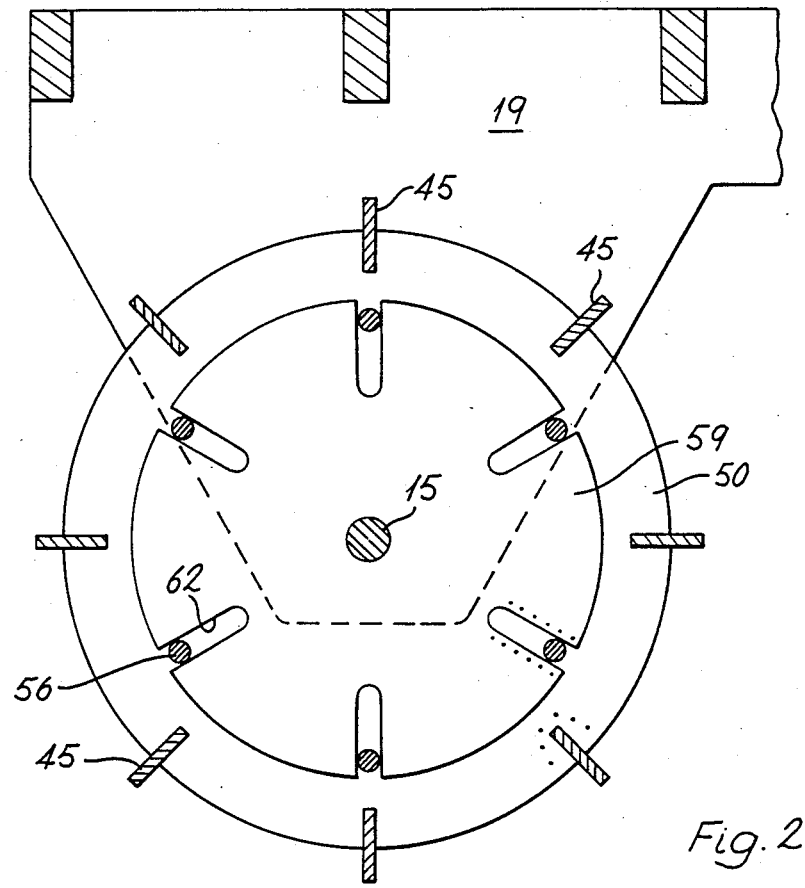
FIG. 2 shows, on a larger scale, an axial view of the rotor assembly used in the device of FIG. 1.
Figure 3:
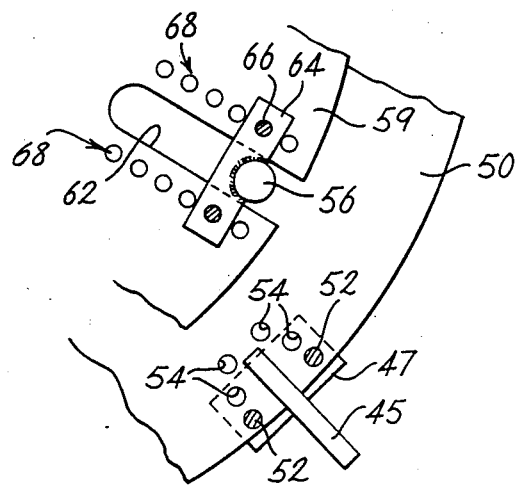
FIG. 3 shows on a yet larger scale, part of the rotor assembly as viewed in FIG. 2.

The actual structure of the two rotors may best be understood from FIG. 1 taken in conjunction with FIGS. 2 and 3. Thus referring now to these three Figures, it will be seen that the outer rotor 13 comprises eight ground-engaging radially-disposed paddle-like members 45 each secured to a respective mounting block 47 (shown only in FIG. 3).

The mounting blocks 47 are in turn attached to the end plates 49,50 of the rotor by bolts or rivets 52. Alternative attachment holes 54 in the end plates 49,50 allow the members 45 to be secured to these plates at different orientations to those illustrated and it will often be advantageous by this means to rake the paddle members 45 forwardly so that they enter the soil with their cross-sections (as viewed in FIG. 2) in a vertical or more vertical disposition than that illustrated. Alternatively, they may be raked rearwardly to give a scooping effect. FIG. 6 illustrates in outline examples of the three different possibilities, namely radial, forwardly raked (i.e. with the radially outer section of the soil-engaging element leading its root portion during rotor rotation) and rearwardly raked.

The inner rotor 12 comprises six soil-engaging bars 56 extending between end plates 58,59 in FIG. 1 and supported in between by one or more intermediate plates 60. In later embodiments there may be 8 to 12 such bars (and the same or a larger number of blades on the outer rotor) so as to give a less jerky action. FIG. 7 illustrates the case of 10 bars on the inner rotor and 12 blades on the outer rotor.

It will be apparent from FIG. 2, that each of the end plates 58, 59 is radially slotted (as shown at 62 for end plate 58) so as to accept the bars 56 which are welded to mounting blocks 64 (shown only in FIG. 3). These latter are secured to the plates 58, 59 and 60 by bolts or rivets 66 passing through attachment holes 68 in the plates. The radial distance of the bars 56 from axle member 15 can be varied by an appropriate resisting of the bolts or rivets 66 in a different pair of attachment holes and, if desired, the bars can also be set on different radii to one another in this way e.g. with alternate bars nearer the axle member 15 than the remaining bars are.

Typically, the external diameters of the rotors 12,13 are about 0.71 m and 0.5 m respectively, resulting in a radial spacing between the two peripheries in excess of 10 mm and in the preferred range of 30 mm (preferably 40 mm) or more.

Although the device 10 can be towed directly from a tractor to act as a cultivation device in its own right, it can instead be adopted to form the last stage of a primary or secondary cultivator. Use of the device 10 as part of a primary cultivator 70 is shown in FIG. 4 where the cultivator is of the sort described in NRDC patents 2137461 and 2163933 but with the conventional crumbler roller described there replaced by the device of the present invention.

Figure 4:
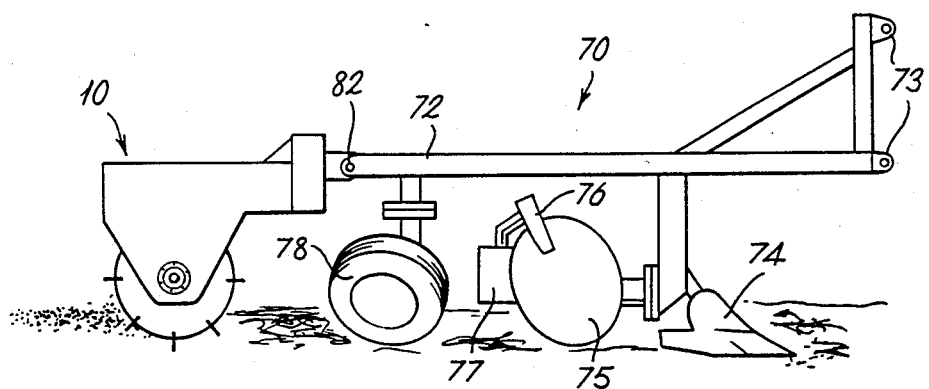
FIG. 4 shows a side elevation of a primary cultivator incorporating the roller device of FIGS. 1 to 3.

In FIG. 4, reference numeral 72 indicates a frame for attachment to a 3-point linkage at 73, and supporting at its front end one of a number of plough-type bodies 74. This is followed by a soil-inversion disc 75 fitted with scrapper 76 and soil-deflector plate 77. Reference numeral 78 indicates a ground wheel tilted to counteract the sideways thrust exerted on the machine by the discs 75 as they move through the soil.

The device may form part of a secondary cultivator used straight on to the ploughed surface, in which case it may be preceded by a power harrow or the like. Alternatively, the device may be used in its own right, in which case it may be preceded by pre-rotor tines designed to feed soil into the rotor. In the front of these two cases i.e. where the device is preceded by a power-harrow etc., the rotor diameters can be significantly reduced e.g. down to about 0.4 meters.

Figure 5:
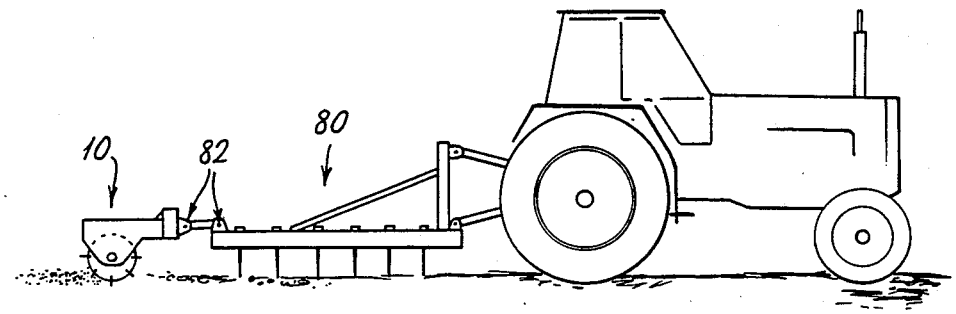
FIG. 5 shows a side elevation of a tractor-towed secondary cultivator incorporating the roller device of FIGS. 1 to 3.

FIG. 5 shows the use of the device 10 as the last stage of a tractor-towed secondary cultivation apparatus 80 of the rigid-tine type.

In operation of the various embodiments described above, the device 10 will be towed over the ground by a tractor or the like with its weight forcing the paddle members 45 of the outer rotor 13 into the ground as illustrated in FIGS. 4 and 5 where the device is purposely attached to the remainder of the cultivation apparatus by horizontal pins 82 to allow this to happen.

In alternative arrangements to those of FIGS. 4 and 5, the pins 82 are omitted and the device 10 is rigidly connected to the preceding parts of the machine.

The rotation of the outer rotor 13 is fed back to the inner rotor by the transmission system 31 as hereinbefore described so as to rotate rotor 12 in the same direction as rotor 13 but at four times its angular speed. The principal effect of the outer rotor 13 will be to hold a section of the soil in place while clods in this section are sheared and otherwise broken up by the fast-rotating inner rotor 12.

For typical forward speeds of 8-10 Km/h say, the linear peripheral speed of the inner rotor bars 56 will be around 1.6 to 8 m/second and this, together with the restraining effect of the outer rotor on the soil under treatment, should result in a significantly more efficient soil-breaking mechanism than has been made available up to now with existing soil-crumbler rolls.

For machines intended to move at faster forward speeds in the range 11-16 Km/h, say, a lower angular speed ratio between the inner and outer rotors may be preferred, e.g. 2:1, and the sprocket transmission system 31 will be varied accordingly.

Turning now to FIGS. 8 and 9, these illustrate rotor designs for alternative embodiments of the device. In FIGS. 8 and 9, the "squirrel cage" inner rotor 12 of the earlier embodiments is replaced by one using either helically disposed elements (FIG. 8) or by a spiral coil (FIG. 9).

FIG. 8a shows an adjustment mechanism for altering the radial positions of the helically disposed bars 84 of the FIG. 8 embodiment. This mechanism differs from that of FIG. 3 in having a bar-embracing U-bolt 86 to secure the bar to the block 64. Prior to respositioning of the bar, the U-bolt is slackened to allow axial movement of the bar relative to the block during the adjustment procedure and the U-bolt is only retightened when the block 64 has been secured in its new position along slot 62 using bolts or rivets 66.

Figure 10:
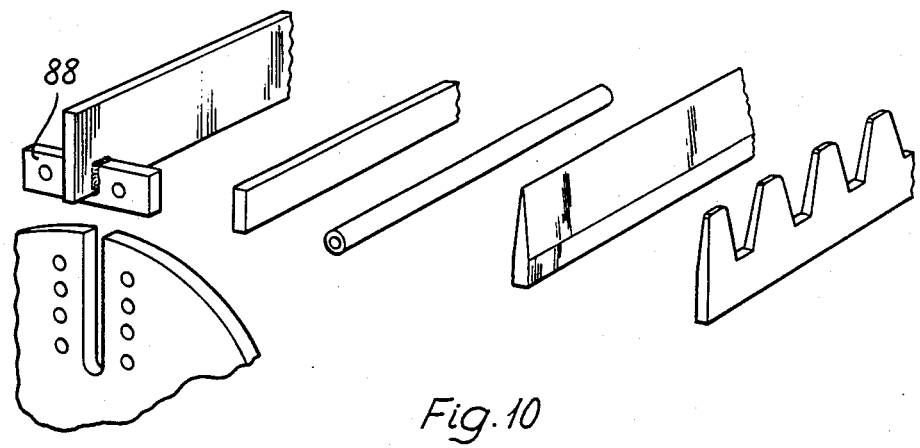
FIG. 10 illustrates alternative designs of ground-engaging elements for use in either the inner and/or the outer rotor of the device.
Figure 11:
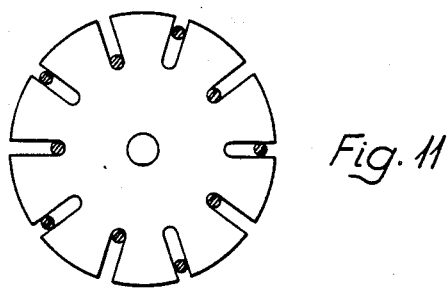
FIGS. 11 to 14 show end views of alternative designs of inner and/or outer rotor of the device.

As already indicated, the soil-engaging parts for the inner and outer rotors may comprise bars and paddles respectively. However, these are only two of many possibilities and FIG. 10 illustrates the use of paddles and bars for either rotor by inverting the end mounting blocks 88. These blocks are shown, for convenience, only in connection with the paddle form of soil-engaging elements.

Where bars are used, these can either be of rod form (as shown for the inner rotor in FIGS. 1 to 3) or they can be of rectangular cross-section or tubular. In all such cases, the root portions of the bars can be arranged so as either to lie at a common radius from the relevant rotor axis (as shown for the inner rotor in FIGS. 1 to 3) or to lie at two or more different radii, as shown for example in FIG. 11.

FIG. 10 also illustrates the use of blades or serrated combs as the soil-engaging parts, it being understood, as before, that these will be end-mounted on blocks 88 for use in either rotor as previously described.

Figures 12, 13, 14:
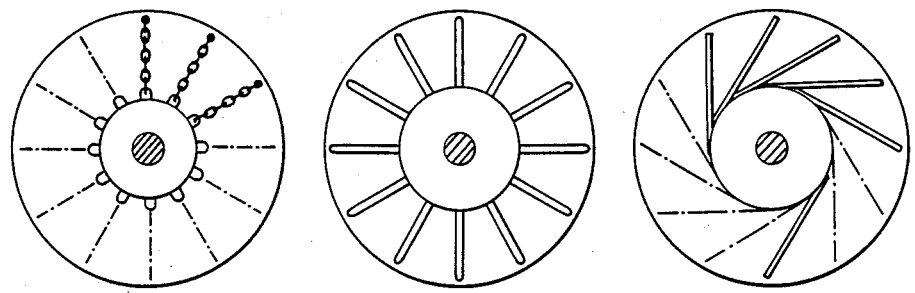

Other possibilities, intended principally, but not exclusively, for the inner rotor parts include flails (FIG. 12), radial spikes (FIG. 13) and non-radial e.g. tangential spikes (FIG. 14).

Figure 16:
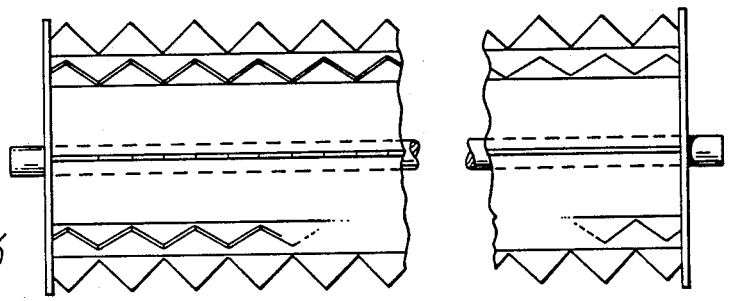
FIGS. 16, 17 and 18 are side views showing rotors for use in further embodiments of the device.

Another alternative, for the inner rotor, is to use saw-teeth distributed around a central drum e.g. as depicted in FIG. 16.

Figure 17:
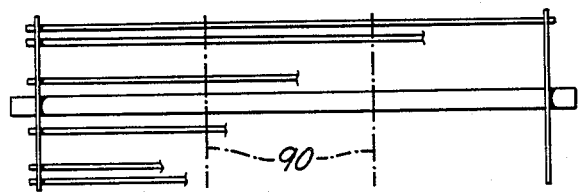

In the embodiment of FIG. 17, the soil-engaging elements (of whatever form) of the inner or outer rotor are accompanied by cutting members 90 spaced apart along the length of the rotor as diagrammatically indicated in broken lines. These members 90 will be of annular form when present on the outer rotor and of annular or disc form when present on the inner rotor.

Figure 18:
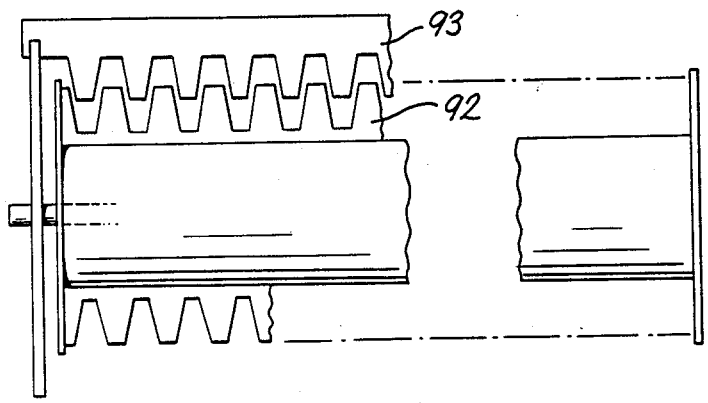

FIG. 18 shows an example of an embodiment in which the soil-engaging parts 92,93 of the inner and outer rotors are serrated or toothed so as to mesh with one another and provide a more aggressive soil treatment system.

Any of the arrangements so far described may be modified by having the two rotors other than co-axial. Four of these possibilities are diagrammatically represented in FIGS. 19 to 22, the linear arrow 95 indicating the direction of forward motion of the machine in each instance. In the first three cases the rotational axis of the inner rotor 12 may either be fixed (FIG. 19) or floating freely (FIG. 20) or floating with restricted vertical motion (FIG. 21) within the outer rotor 13. In the fourth case (FIG. 22) the inner rotor is moved bodily within the outer rotor by a support arm 97 rotating about the axis of the outer rotor as shown.

In the non co-axial arrangements above described, the outer rotor may conveniently be carried on three 120°-spaced support rollers 99 and the drive to the inner rotor can be provided by any suitable means including those referred to in respect of the co-axial versions (though modified, if necessary, to take account of any required bodily movement of the inner rotor within the confines of the outer-rotor).

Figure 19:
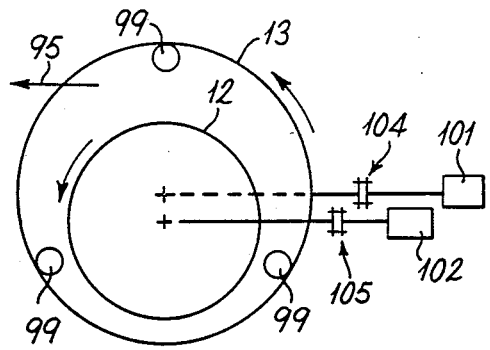
FIGS. 19 to 27 are simplified diagrammatic representations of different mounting and/or drive arrangements for various embodiments of the device.
Figure 20:
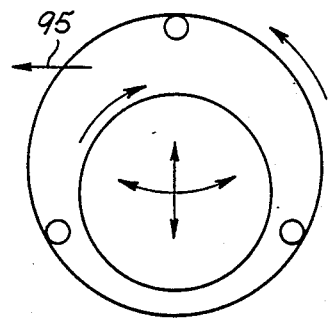

In the embodiment of FIG. 19, the two rotors may, for example, be associated with individual drives 101,102 whereas in the embodiment of FIG. 20 (in which the drive to the outer rotor has been omitted for clarity), the freely moving inner rotor may be counter-rotated by engagement with the inner surface of the outer rotor or its load.

Reference numerals 104,105 in FIG. 19 indicate known overload protection systems e.g. two drive plates interconnected by shear bolts. Though normally present on the other embodiments described, these overload protection systems have been omitted from the other Figures for reasons of clarity.

Figure 21:
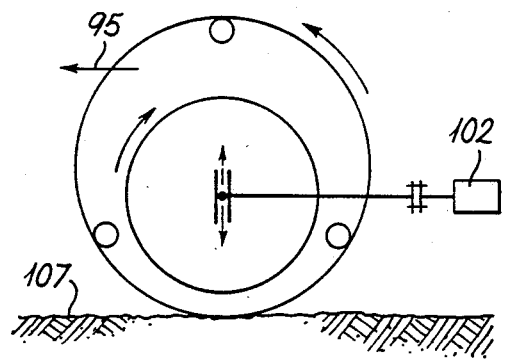
Figure 22:
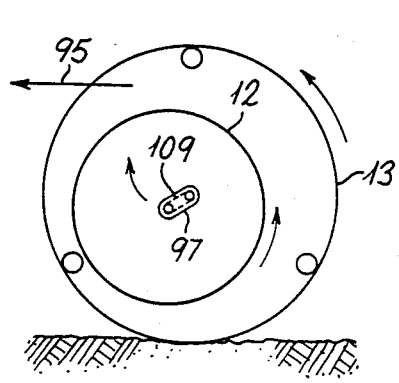

In the embodiment of FIG. 21, the outer rotor is driven by engagement with the ground 107 and only the inner rotor is powered. The embodiment of FIG. 22, on the other hand, utilises, by way of example only, a ground-driven outer rotor 13 and an inner rotor 12 driven (at a higher speed) via a chain and sprocket drive 109 (not to scale) from the outer rotor.

Other drive systems may equally well be used and examples of some of these are diagrammatically represented in FIGS. 24 to 27.

Figure 24:
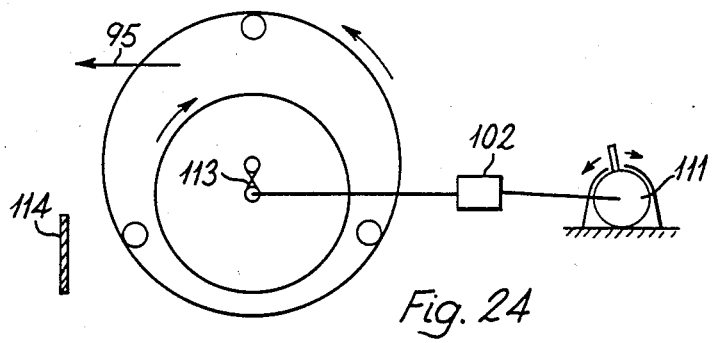

Thus FIG. 24 shows the case of the inner rotor driven from a power source 102 regulated by a manual (or automatic) control 111. The drive for the outer rotor is derived from the (oppositely rotating) inner rotor by a chain and sprocket drive 113.

Reference numeral 114 indicates a baffle plate to deflect the treated soil back to earth (and to provide some additional degree of clod breakage).

Figure 25:
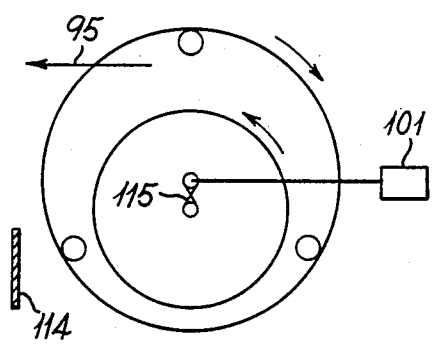

In FIG. 25 it is the outer rotor that is powered and the drive for the oppositely rotating inner rotor is derived via a chain and sprocket drive 115. It is to be noted that in the particular case shown in FIG. 25, the outer rotor is being driven in the opposite sense to that which would be taken by a ground wheel and this facility can be incorporated in any of the other systems in which the outer rotor is not driven by direct engagement with the ground. A baffle plate 114 is again included.

Figure 26:
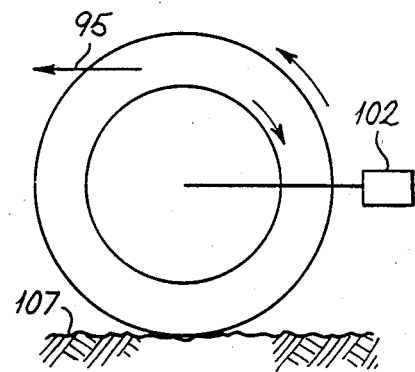
Figure 27:
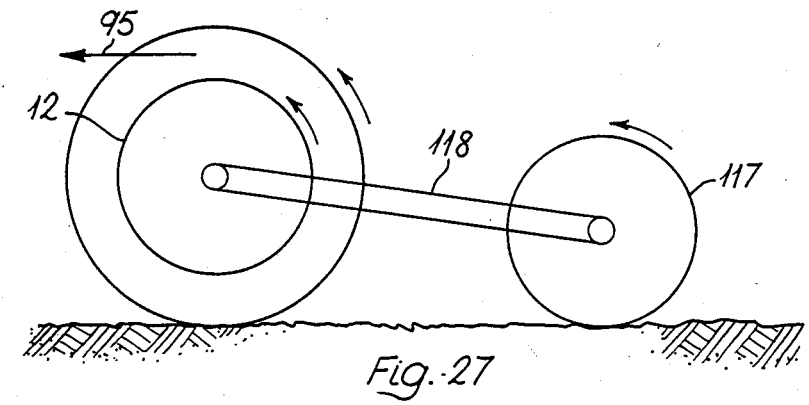

FIG. 26 illustrates the case where the outer rotor is driven by engagement with the ground and a co-axial inner rotor is counter-rotated by a power source 102. The assembly of FIG. 27 is similar except that the drive for the (co-rotating) inner rotor 12 is derived from a separate ground wheel 117 via a chain and sprocket drive 118 (not to scale).

Obviously, the drive arrangements for the non-coaxial systems illustrated in FIGS. 19,20,21,24 and 25 are suitable for the corresponding non-illustrated co-axial versions of these systems. Equally, the drive arrangements for the co-axial systems of FIGS. 26 and 27 are also suitable for the corresponding non-coaxial versions of these two systems. The disclosure of the present specification should be interpreted as including all such combinations and modifications falling within the scope of the present invention.

Figure 23:
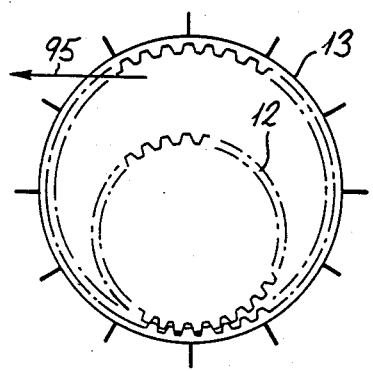

One of several alternative drive means for the inner rotor 12 would be by means of an epicyclic drive derived from the outer rotor 13 and one such case is illustrated in FIG. 23.

It will be noted that although the inner and outer rotors may rotate in the same rotational sense, in the embodiments of FIGS. 20,21 and 23 to 26, the drive mechanisms operate to cause the inner and outer rotors to counter-rotate. Clearly, it is an easy matter to modify the co-rotating rotor embodiments so that the rotors counter-rotate and to modify the counter-rotating rotor embodiments so that the rotors co-rotate. For example, this can be done by reversing the direction of drive of one or other of the two drive units 101,102 or by replacing the crossed chain and sprocket drive of FIGS. 24 and 25 by those of FIGS. 22 and 27, or vice versa. The disclosure of the present invention should be taken to include all such modifications and combinations falling within the scope of the present invention.

Figure 15:
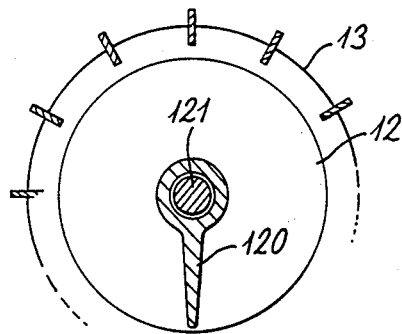
FIG. 15 is an end view of an embodiment in which an additional soil-engagement part has been included.

Any of the systems described above may be provided (after structural modifications if necessary) with a third soil-engaging element located inside the inner rotor. By way of example, FIG. 15 shows one such arrangement in which the additional element is provided by a hanging baffle 120 loosely mounted on the axle member 121 for the inner rotor 12. The drive means for this embodiment has been omitted from the Figure for reasons of clarity but may, for example, be of any of the types above discussed.

Figure 28:
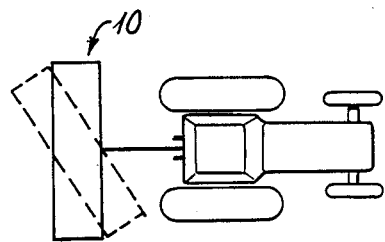
FIGS. 28 is a plan view illustrating different operational positions of the device.

FIG. 28 illustrates two ways of mounting the device 10 i.e. either transversely to the direction of tractor motion (full lines or at an angle thereto (broken lines).

For road transport, the rotor may be pivotally mounted (or a split-rotor may be used) in the same way as currently used for other agricultural machinery of similar elongate construction.

Figure 29:
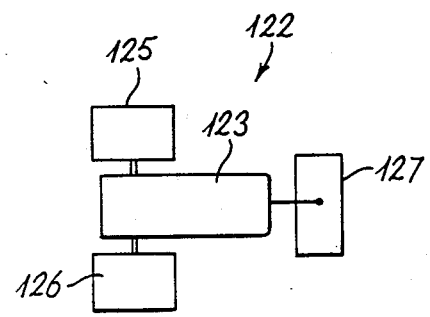
FIGS. 29 and 30 are respectively plan and side views of self-propelled and tractor-mounted secondary cultivators incorporating crumbler devices in accordance with the present invention.

Turning now to FIG. 29 of the drawings, this shows a self-propelled secondary cultivator 122 which comprises a tractor body or tractor-like body 123 supported on rear rotors 125,126 and a steerable front rotor 127. Each of the rotors 125,126,127 comprises a cultivating rotor of any of the types hereinbefore described, the front rotor 127 extending sufficiently sidewardly to cultivate the full strip of ground untreated by the rear rotors 125,126.

Conveniently, the rear rotors will have an external diameter of 1.5 meters and a width of up to 1 meter while the corresponding figures for the front rotor are 0.71 meters and 1.5 meters respectively.

To complete the soil treatment, the cultivator 122 could be used to tow a Dutch harrow or seed drill etc. (not shown).

Figure 30:
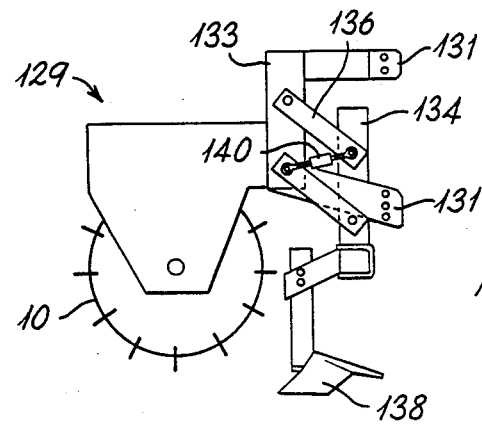

FIG. 30 shows a self-contained secondary machine 129 with attachment parts 131 for the tractor three-point linkage. Reference numeral 10 indicates a cultivating device in accordance with the present invention mounted on a rear end beam 133 which is supported on a front end beam 134 by a parallagram linkage 136.

In this machine, the ground-crumbling assembly (10) is preceded by four or five winged tines 138 mounted on beam 133. The purpose of these tines is to lift soil into the outer rotor of the assembly. Two of the tines will preferably be positioned so as to act on the ground over which run the wheels of the towing the tractor. The height of the winged tines 138 can be set using the turnbuckle 140 as shown.

It is to be understood that, unless mutually exclusive features from any of the described systems may be interchanged with those of any other such system. Some examples of this have already been specifically referred to above in the specification and this direction is to be very broadly interpreted. Thus, purely by way of illustrative example, the disclosure is to be interpreted as including the case where a non-coaxially mounted inner rotor (FIG. 19) is located in a powered rearwardly-rotating outer rotor (FIG. 25), the forwardly-rotating inner rotor being driven from a groundwheel (FIG. 27). Similarly, for example, the baffle plates 114 of FIGS. 24 and 25 may be included in other described embodiments where this is thought to be advantageous.

Other variations of the illustrated embodiments within the scope of the present invention will be apparent from the introductory paragraphs of the application which outline in broad terms some of the different possibilities.

I claim:

1. A rotary clod crumbler device mounted for forward movement along the ground, the device comprising inner and outer soil-treatment rotors mounted for rotational movement about a common axis lying transversely to the direction of forward movement of the device, the outer rotor having elongate soil-engaging parts extending transversely to the direction of forward movement of the device, the inner rotor having soil-engaging parts extending radially of the common axis and drive means operative to drive the inner rotor in the same rotational sense as the outer rotor but at a different peripheral speed thereby to impose shearing forces on soil simultaneously engaged by the parts of the two rotors.

2. A device as claimed in claim 1 in which the soil-engaging parts of the inner rotor are arranged in a helical array.

3. A device as claimed in claim 1 in which the soil-engaging parts of the outer rotor are helically disposed.

4. A device as claimed in claim 1 including means for driving the inner rotor at up to about ten times the rotational speed of the outer rotor.

5. A device as claimed in claim 1 including control means for altering the rotational speed of the inner rotor.

6. A device as claimed in claim 1 including means for driving the inner rotor with a peripheral speed of from 1.8 to 13 meters per second.

7. A device as claimed in claim 1 including drive means for driving the inner and outer rotors in the same rotational sense as a ground wheel.

8. A device as claimed in claim 1 in which the outer rotor acts as a ground wheel.

* * * * *